United States Patent
Das et al.

(10) Patent No.: US 10,666,498 B2
(45) Date of Patent: May 26, 2020

(54) ARCHITECTURE FOR WIRELESS AVIONICS COMMUNICATION NETWORKS

(71) Applicant: ROSEMOUNT AEROSPACE INC., Burnsville, MN (US)

(72) Inventors: Subhra Kanti Das, Bangalore (IN); Adishesha Chinknyakanhalli Sivaramasastry, Karnataka (IN); Ramamurthy Prasanna, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 16/015,663

(22) Filed: Jun. 22, 2018

(65) Prior Publication Data

US 2019/0334760 A1    Oct. 31, 2019

(30) Foreign Application Priority Data

Apr. 26, 2018    (IN) .............................. 201811015861

(51) Int. Cl.
*H04L 12/24*    (2006.01)
*H04B 17/318*    (2015.01)
*H04L 29/08*    (2006.01)

(52) U.S. Cl.
CPC ....... *H04L 41/0654* (2013.01); *H04B 17/318* (2015.01); *H04L 67/12* (2013.01)

(58) Field of Classification Search
CPC .... H04L 41/0654; H04L 67/12; H04B 17/318
See application file for complete search history.

(56) References Cited

U.S. PATENT DOCUMENTS

| | | | |
|---|---|---|---|
| 7,558,701 B2* | 7/2009 | Andarawis | G01M 5/00 702/183 |
| 7,742,425 B2* | 6/2010 | El-Damhougy | H04L 67/12 370/241 |

(Continued)

FOREIGN PATENT DOCUMENTS

CN    105005200 A    10/2015

OTHER PUBLICATIONS

Coronado Estefania et al., "Wi-Not: Exploiting radio diversity in software-defined 802.11-based WLANs", 2018 IEEE/IFIP Network Operations and Management Symposium, IEEE, Apr. 23, 2018, pp. 1-4.

(Continued)

*Primary Examiner* — Brian T O Connor
(74) *Attorney, Agent, or Firm* — Cantor Colburn LLP

(57) ABSTRACT

Embodiments of the invention include methods and systems for architectures for wireless avionics communication networks. The embodiments further include detecting a signal strength of wireless nodes, assigning a primary data controller and standby data controller for each of the wireless nodes based at least in part on the signal strength, and generating a deployment matrix based on the assignment of the primary data controller and the standby data controller. The embodiments also include broadcasting the deployment matrix over a wired connection, allocating a buffer size based on data rates of each of the wireless nodes connected to the primary data controller and the standby data controller, and exchanging data based on the deployment matrix.

15 Claims, 8 Drawing Sheets

(56) References Cited

U.S. PATENT DOCUMENTS

| | | | |
|---|---|---|---|
| 7,941,479 B2* | 5/2011 | Howard | G06F 8/45 |
| | | | 706/10 |
| 8,341,298 B2 | 12/2012 | Wilber et al. | |
| 8,344,912 B2 | 1/2013 | Mitdhell et al. | |
| 8,644,264 B2* | 2/2014 | Coralli | H04B 1/7107 |
| | | | 370/335 |
| 9,183,983 B2* | 11/2015 | Liffring | H01F 38/14 |
| 9,816,897 B2 | 11/2017 | Ziarno | |
| 9,837,093 B2* | 12/2017 | Filippini | G10L 19/167 |
| 9,887,747 B2* | 2/2018 | Zummo | H04L 27/0006 |
| 10,277,280 B2* | 4/2019 | Milne | H02J 7/0054 |
| 2008/0069065 A1* | 3/2008 | Wu | H04W 36/08 |
| | | | 370/340 |
| 2008/0123553 A1 | 5/2008 | Boyina | |
| 2011/0057830 A1* | 3/2011 | Sampigethaya | G01S 5/0072 |
| | | | 342/36 |
| 2011/0310879 A1* | 12/2011 | Wu | H04W 72/1231 |
| | | | 370/345 |
| 2012/0084839 A1* | 4/2012 | Ayyagari | H04L 67/12 |
| | | | 726/4 |
| 2012/0182143 A1* | 7/2012 | Gaines | A61B 5/0022 |
| | | | 340/539.12 |
| 2012/0201179 A1* | 8/2012 | Das | H04W 52/0219 |
| | | | 370/311 |
| 2012/0229271 A1* | 9/2012 | Davis | G08B 25/004 |
| | | | 340/539.12 |
| 2014/0140209 A1* | 5/2014 | Shihada | H04L 43/0864 |
| | | | 370/230 |
| 2016/0157111 A1 | 6/2016 | Mueller | |
| 2018/0019894 A1 | 1/2018 | Singh et al. | |

OTHER PUBLICATIONS

Dang et al., "Fly-by wireless for next generation aircraft: challenges and potential solutions", Wireless Days, 2012 IFIP, IEEE, Nov. 21, 2012, pp. 1-8.

European Search Report for Application No. 19171187.8-1213, dated Aug. 16, 2019, 17 pages.

* cited by examiner

| Deployment Matrix | | | | | |
|---|---|---|---|---|---|
| Short Address | MAC Address | Data Rate | Primary Data Controller ID | Secondary Data Controller ID | Primary Channel | Standby Channel |

ARCHITECTURE FOR WIRELESS AVIONICS COMMUNICATION NETWORKS

CROSS-REFERENCE TO RELATED APPLICATIONS

This application claims the benefit of Indian Application No. 201811015861 filed Apr. 26, 2018, which is incorporated herein by reference in its entirety.

BACKGROUND

The present disclosure relates generally to wireless communications, and more specifically to architectures for wireless avionics communication networks.

Aircrafts are equipped with monitoring systems to collect different types of data. Data is collected to ensure the safety and reliability of the aircraft systems. The information gathered is used to target improvements to the functioning of the systems and maintenance to reduce the downtime for the aircrafts. These monitoring systems provide the ability to obtain in-flight data as well as data generated during ground/taxi operations.

BRIEF DESCRIPTION

According to one or more embodiments, methods for communicating in an architecture for wireless avionics communication network are provided. Methods include detecting a signal strength of wireless nodes, assigning a primary data controller and standby data controller for each of the wireless nodes based at least in part on the signal strength, and generating a deployment matrix based on the assignment of the primary data controller and the standby data controller. Methods also include broadcasting the deployment matrix over a wired connection, allocating a buffer size based on data rates of each of the wireless nodes connected to the primary data controller and the standby data controller, and exchanging data based on the deployment matrix.

In addition to one or more of the features described above, or as an alternative, further embodiments may include wherein the deployment matrix identifies a primary channel and standby channel of the primary data controller and a primary channel and standby channel of the standby data controller.

In addition to one or more of the features described above, or as an alternative, further embodiments may include responsive to the failure of the primary channel of the primary data controller, selecting a secondary channel of the primary data controller indicated in the deployment matrix.

In addition to one or more of the features described above, or as an alternative, further embodiments may include responsive to a failure of the standby channel of the primary data controller, selecting a primary channel of a standby data controller indicated in the deployment matrix.

In addition to one or more of the features described above, or as an alternative, further embodiments may include responsive to a failure of the primary channel of the standby controller, selecting a standby channel of the standby controller indicated in the deployment matrix.

In addition to one or more of the features described above, or as an alternative, further embodiments may include responsive to a failure of the standby channel of the standby data controller, entering an idle mode.

In addition to one or more of the features described above, or as an alternative, further embodiments may include implementing a dynamic buffering scheme, wherein each buffer is configured to receive data at different data rates from each of the wireless nodes.

In addition to one or more of the features described above, or as an alternative, further embodiments may include wherein a network manager transmits data from obtained from wireless nodes to an aircraft application for monitoring health of an aircraft.

According to other embodiments, systems for wireless avionics communication network are provided. Systems include a network manager, a primary data controller having a first and second communication interface, a standby data controller having a first and second communication interface, wherein the primary data controller and the standby data controller are coupled to the network manager over a wired connection, and one or more wireless nodes, wherein the wireless nodes are configured to transmit data at different rates over a wireless connection.

In addition to one or more of the features described above, or as an alternative, further embodiments may include where the primary data controller and the standby data controller each include a dynamic buffer configured to receive data at different rates from one or more wireless nodes.

In addition to one or more of the features described above, or as an alternative, further embodiments may include wherein the network manager stores a deployment matrix identifying a primary channel and standby channel of the primary data controller and a primary channel and standby channel of the standby data controller.

In addition to one or more of the features described above, or as an alternative, further embodiments may include responsive to the failure of the primary channel of the primary data controller, one or more wireless nodes communicate over a secondary channel of the primary data controller indicated in the deployment matrix.

In addition to one or more of the features described above, or as an alternative, further embodiments may include responsive to a failure of the secondary channel of the primary data controller, one or more wireless nodes communicate over a primary channel of a standby data controller indicated in the deployment matrix.

In addition to one or more of the features described above, or as an alternative, further embodiments may include responsive to a failure of the primary channel of the standby controller, one or more wireless nodes communicate over a standby channel of the standby controller indicated in the deployment matrix.

In addition to one or more of the features described above, or as an alternative, further embodiments may include responsive to a failure of the standby channel of the standby data controller, one or more wireless nodes enter an idle mode.

BRIEF DESCRIPTION OF THE DRAWINGS

The following descriptions should not be considered limiting in any way. With reference to the accompanying drawings, like elements are numbered alike:

FIG. 3 depicts a deployment matrix used to configure an architecture for wireless avionics communication networks;

DETAILED DESCRIPTION

In today's environment, wired communications have limitations on the flexibility and scalability to accommodate the scale of thousands of additional sensors onboard an aircraft. Previously, aircraft communications were implemented through wired networks that include Ethernet, ARINC, CAN bus and so on. As more and more sensors are used to collect various data in a wired configuration, the number of cables, lines and wires that are used also increases. Not only do the excess wires consume valuable limited space, but they also add extra load to the aircraft that must be supported in flight further limiting the scalability of adding sensors.

Utilizing large volumes of wired sensors and interfaces do not provide flexible and scalable solutions to establish efficient communications. Additionally, the maintenance costs increase as more hardware is added to the system. Troubleshooting can become difficult when attempting to locate specific connections of the many wires. Furthermore, the collected data that is transmitted wirelessly must be protected from unauthorized access and tampering for security and reliability reasons. There is a need for wireless communication architecture onboard aircraft that is fault tolerant, robust, secure and scalable.

The techniques provided herein provide a layered network architecture for wireless avionics communication. The techniques also incorporate spatial and spectral redundancy in the wireless network to ensure the data exchange is reliable. In addition, one or more embodiments of the invention allow for the exchange of both synchronous and asynchronous data with internal and external applications. Also included in the system is a dynamic buffering scheme which allows for data transmitted at different rates to be buffered at a wireless data controller to minimize data loss.

Figure 1:
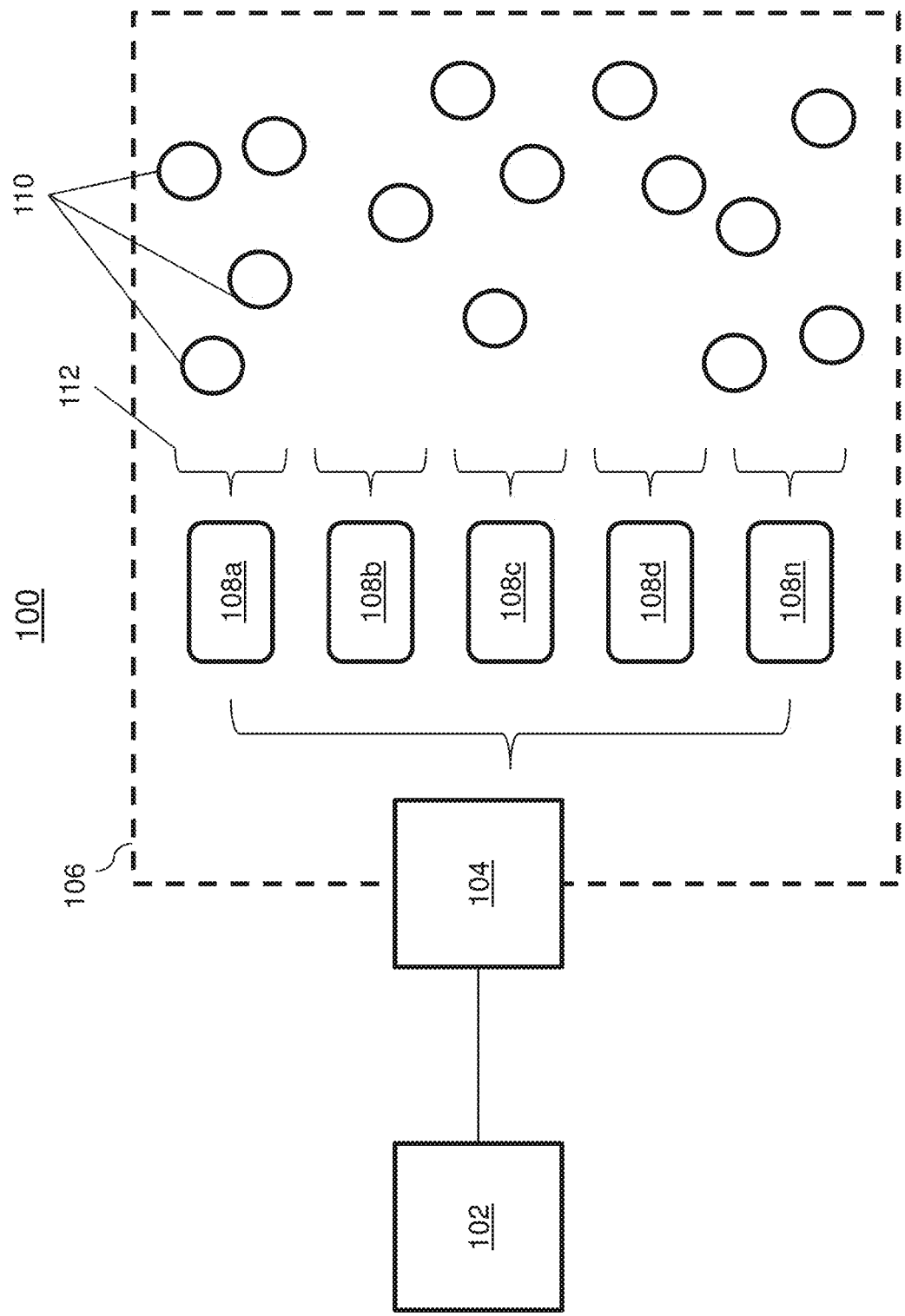
FIG. 1 depicts a system for architectures for wireless avionics communication network in accordance with one or more embodiments of the invention.

Now referring to FIG. 1, an architecture 100 for wireless avionics communication networks is shown. As illustrated in FIG. 1, several aircraft applications 102 can include applications such as IVHM, EHM SHM, PHM, data loggers, etc. At a first layer of the wireless architecture, a network manager 104 is configured to communicate with external applications such as aircraft applications 102 and the network 106. In one or more embodiments of the invention, the network manager 104 is configured for bi-directional communication with the wireless data controllers 108a-108n.

The second layer includes one or more data controllers 108a-108n. The wireless data controllers are configured for bi-directional communication with the wireless nodes 110. The wireless nodes include device such as but not limited to wireless sensor nodes, wireless actuator nodes, and the like. In one or more embodiments of the invention the wireless data controllers 108 are capable of synchronous and asynchronous communication Also, the wireless data controllers 108 is capable of aggregating/consolidating the data received from the wireless nodes 110 and transmitting the aggregated data to the network manager 104. As discussed below the data controllers 108 are configured with receive queues/buffers to buffer data that is received at various data rates.

The third layer of the wireless architecture 100 includes one or more wireless nodes such as wireless nodes 110. The wireless nodes 110 are configured to transmit and receive data at different rates and priorities. In addition, the sensor nodes 110 can be grouped into different clusters 112 that are associated with respective wireless data controllers 108 by various techniques.

In one or more embodiments of the invention, the network manager 104 communicate with the data controllers 108 over a wired connection and the wireless data controllers 108 communicate with the wireless nodes 110 over a wireless connection.

Figure 2:
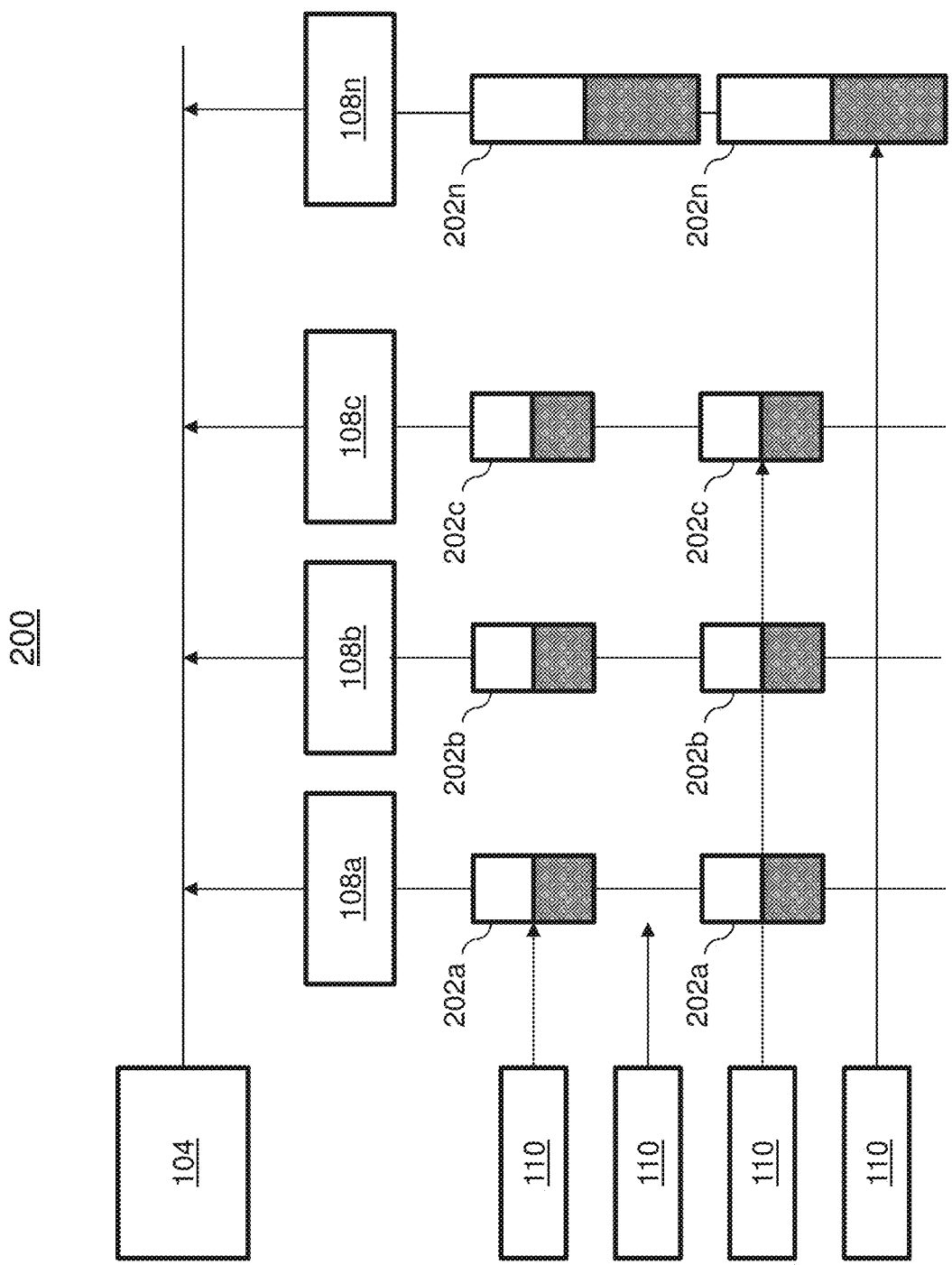
FIG. 2 depicts a buffering scheme of an architecture for wireless avionics communication networks.

Referring now to FIG. 2, a buffering scheme 200 at a wireless data controller for achieving asynchronous communication with multi-rated nodes. FIG. 2 includes a network manager 104, a plurality of data controllers 108, and sensor nodes 110 similar to that shown in FIG. 1. FIG. 2 also depicts a plurality of buffers 202a-202n is shown.

In one or more embodiments of the invention, a synchronous communication is achieved between the applications 102 and the network manager 104 by sending data request to the data controllers at a periodic interval of time.

Asynchronous communication occurs between the wireless nodes 110 and wireless data controllers 108 are achieved through a dynamic buffering mechanism in the wireless data controller 108. In one or more embodiments of the invention, the wireless nodes 110 transmit data to the respective associated data controllers 108, where the data controllers 108 store the data received in respective receive queues. Subsequently, the data is transmitted from the wireless data controller 108 to the network manager 104 in a FIFO manner to ensure reliable data transmission. Data loss is minimized using the dynamic buffering scheme which is configured to store data from faster nodes as well as slower nodes.

Referring now to FIG. 3, deployment matrix 300 in accordance with one or more embodiments of the invention is shown. In one or more embodiments of the invention, the deployment matrix includes at least the following information: short address, MAC address, data rate, primary data controller ID, standby data controller ID, primary channel, standby channel, etc. It is to be understood that embodiments of the invention can include storing other information and different combinations of information in the deployment matrix 300 at the network manager 104.

The short address is a node identifier used by the data controllers to communicate in the network. The IP address is the logical network address of the node. The data rate indicates the rate at which data is transmitted from the node. Primary data controller ID and the standby data controller ID indicate a network identifier for the primary data controller and the redundant data controller respectively. Primary channel indicates the primary channel for communication and the second channel indicates a redundant channel.

Figure 4:
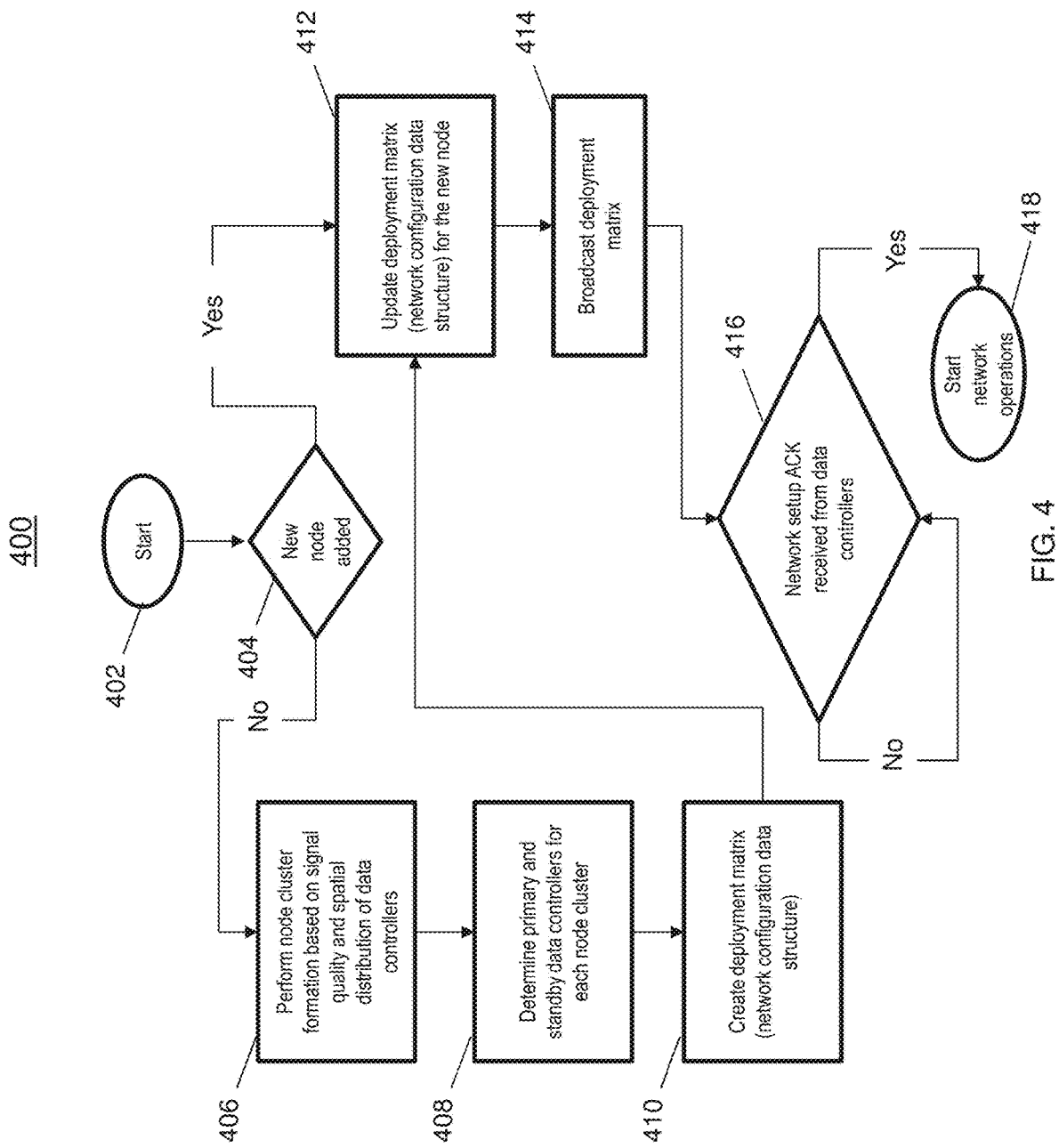
FIG. 4 depicts a flowchart for configuring an architecture for wireless avionics communication networks.

Now referring to FIG. 4, a flowchart 400 for implementing an architecture for wireless avionics communication networks is shown. The process begins at block 402. At decision block 404, it is determined whether a new node has been added. In the event, a new node is not added at block 404, the process continues to block 406 to perform cluster formation based on signal quality and spatial distribution of data controllers. In one or more embodiments of the invention the cluster formation can be formed based on the signal strength between the wireless data controllers and the wireless nodes. In addition, the load of the connected wireless nodes can be balanced among the wireless data controllers to achieve the optimum distribution and efficient utilization of bandwidth/resources.

At block 408 the primary and standby data controllers for each node cluster are determined and block 410 provides creating a deployment matrix such as the deployment matrix 300 of FIG. 3 based on the assignment of the wireless data controllers and communication channels. The process continues to block 412 to updating the deployment matrix.

Block 414 provides broadcasting the deployment matrix. In one or more embodiments of the invention, the deployment matrix is broadcasted to each of the wireless data controllers to configure the wireless nodes for communication.

Block 416 a network setup ACK is received from the wireless data controllers responsive to receiving the broadcast deployment matrix. In the event the ACK is not received the network manager can re-broadcast the deployment matrix either periodically or responsive to an update/addition of a new wireless node. At block 418 the network operations/communications commences implementing the spatial and spectral redundancies described below.

Spatial redundancy corresponds to the physical location of the one or more data controller(s). Spectral redundancy corresponds to multiple channels of communication in the allocated spectrum. In order to achieve spatial redundancy at least two wireless data controllers are selected for each wireless node cluster. A first primary wireless data controller and a second standby wireless data controller. The nodes in a given cluster are associated with the primary data controller by default. In the event the connection is disrupted, the wireless node attempts to associate with the designated standby controller as provided in the deployment matrix.

In order to each spectral redundancy, wireless data controllers communicate with the nodes over a primary channel in the allocated spectrum by default. In the event there is a loss of a connection on the primary channel due to interference, poor signal quality or failure of the corresponding radio module for that channel, the nodes switch to one or more standby channels so that there is no disruption in communication. The primary and standby channels are pre-defined in the deployment matrix and are controlled by the network manager.

The wireless nodes connect with the primary data controller on the standby channel if communication is lost on the primary channel. If the communication on the standby channel fails, then the node tries to communicating with the standby data controller on its primary channel. If that channel fails, the wireless node attempts to associate with the standby controller on the standby channel. In one or more embodiments of the invention, the wireless nodes enter an idle mode if communication also fails on the standby channel of the standby controller. The wireless nodes can be configured to periodically attempt to re-associate to exit the idle mode and become active in data collection. In one or more embodiments of the invention, the spectral redundancy has higher precedence than the spatial redundancy.

Figure 5:
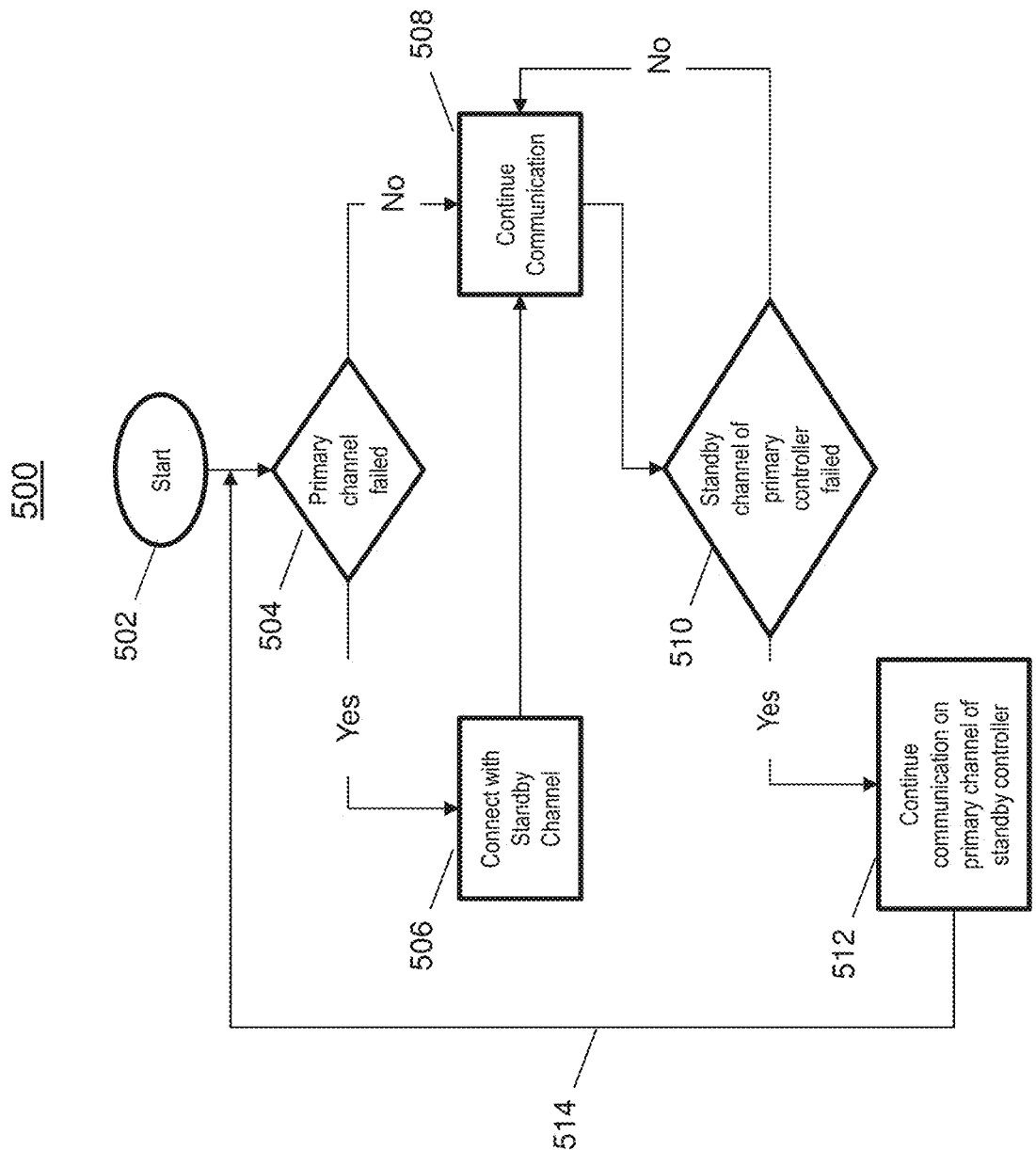
FIG. 5 depicts a flowchart for fault tolerance in an architecture for wireless avionics communication networks.

Referring now to FIG. 5, a flowchart 500 for implementing fault-tolerance in an architecture for wireless avionics communication networks is shown. The process for implementing spectral redundancy begins at block 502.

At decision block 504 it is determined whether the primary channel of the primary wireless data controller has failed. If it is determined that a failure has occurred (where the failure can be based on a quality threshold or a complete disconnection), the process continues to block 506 which provides the given sensor node will connect to a standby channel of the primary data controller and advances to block 508 continuing the communication.

If the primary channel has not failed at decision block 504 the process continues to block 508 and continues the communication. At decision block 510 it is determined whether the standby channel of the primary controller has failed. If the standby channel is not in a failure state the process advances to block 508 continuing the communication. If a failure state of the standby channel of the primary controller is determined, the process advances to block 512 to continue communication on a primary channel of the standby controller indicated in the deployment matrix such as the deployment matrix 300 of FIG. 3. The process continues to detect the status of the primary channel and repeats the cycle as shown by 514. In one or more embodiments, wireless nodes can enter the idle mode after failure of both data controllers has been detected.

Figure 6:
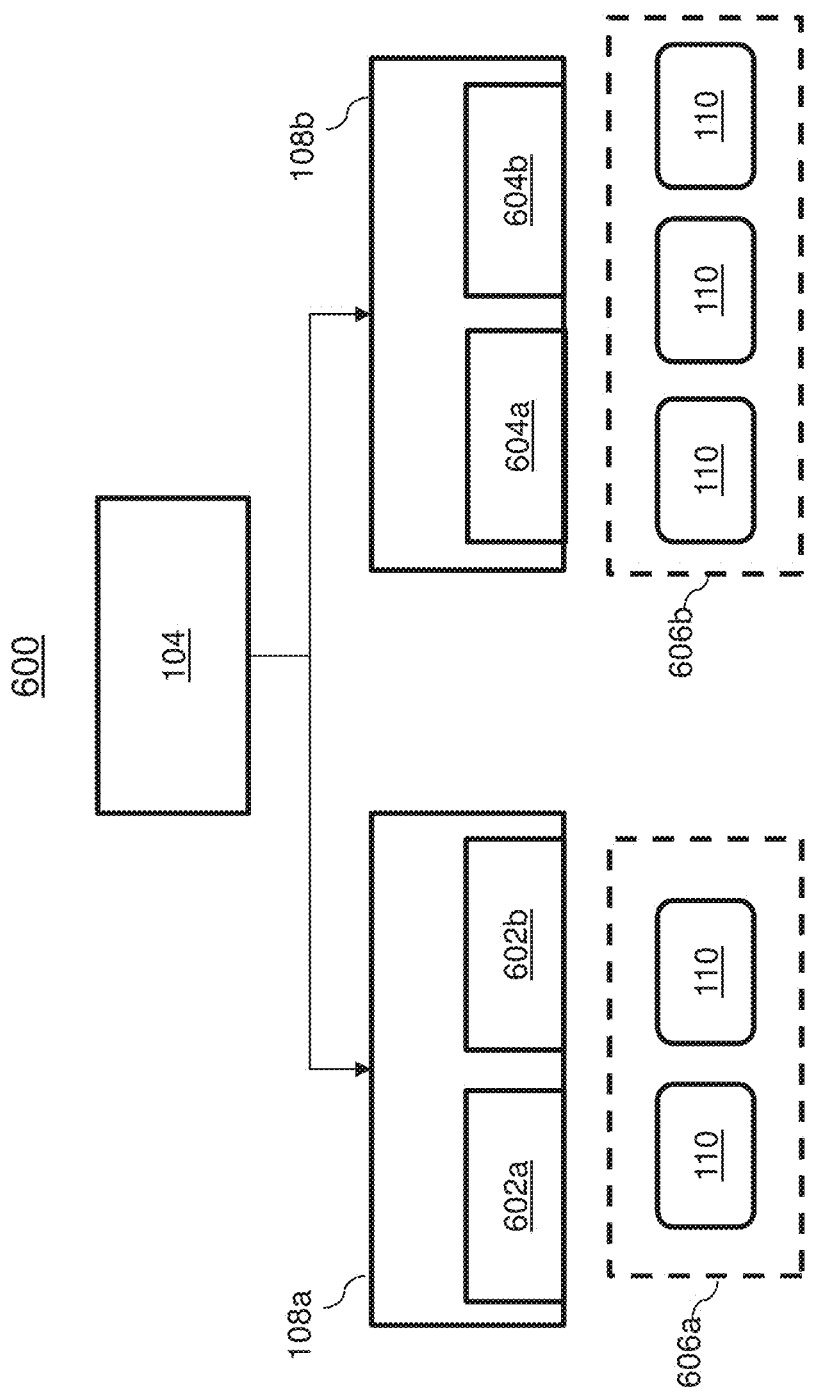
FIG. 6 depicts a configuration of an architecture for wireless avionics communication networks.

Now referring to FIG. 6, a configuration 600 for implementing an architecture for wireless avionics communication networks is shown. The configuration 600 includes a network manager 104, wireless data controllers 108 and wireless nodes 110 which are similar to that shown in FIG. 1. Although only two wireless data controllers 108, two clusters 606 and a plurality of sensors 110 are provided in FIG. 6, it should be understood that one or more wireless data controllers, sensors and clusters can be included in the system. The clusters 606 of wireless nodes 110 can be determined based on the detected signal strength of a signal received at the wireless data controller 108 or wireless nodes 110. For example, the signal quality, interference or other signal-to-noise ratio type information can be used to form the clusters 606. As illustrated the cluster 606a communicates with the wireless data controller 108a as a primary wireless data controller and wireless data controller 108b as the standby data controller. On the other hand, cluster 606b communicates with wireless data controller 108b as a primary wireless data controller and wireless data controller 108a as the standby data controller. The wireless data controller 108a includes a primary interface 602a and standby interface 602b for communicating with the respective wireless nodes 110 and clusters 606. Similarly, the wireless data controller 108b includes a primary interface 604a and standby interface 604b for wireless communication. As previously noted, the wireless data controllers 108 communicate with the network manager 104 over a wired connection and communicates with the wireless nodes 110 over a wireless connection. In addition, the wireless data controllers 108 are configured to exchange data at different rates by implementing the dynamic buffering scheme.

Figure 7:
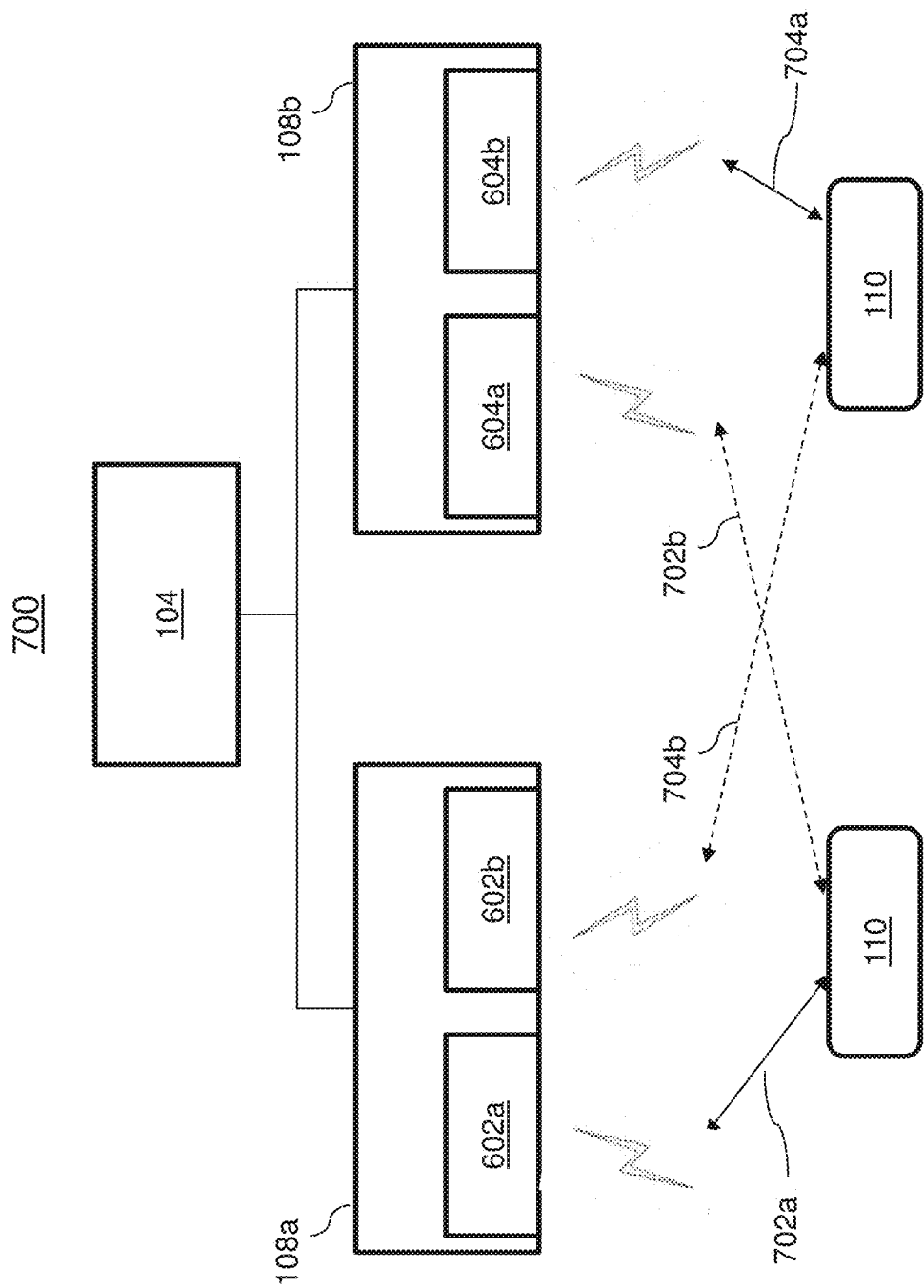
FIG. 7 depicts a fault tolerant of an architecture for wireless avionics communication networks.

Now referring to FIG. 7, a fault-tolerant configuration 700 for implementing an architecture for wireless avionics communication networks is shown. FIG. 7 illustrates how the wireless nodes 110 exploit the spatial and spectral redundancies in a consistent manner such that there is no interruption in communication with the applications.

The configuration 700 includes a network manager 104, wireless data controllers 108 and wireless nodes 110 similar to that shown in FIG. 1. In addition, the wireless data controllers 108 have a similar configuration as shown in FIG. 6 including a interfaces 602a, 604a and interfaces 602b, 604b. FIG. 7 illustrates a wireless node 110 communicates with primary wireless data controller 108a over a wireless connection 702a and standby wireless data controller 108b over wireless connection 702b. Similarly, a different wireless node 110, communicates with a primary data controller 108b over a wireless connection 704a and a standby controller 108a over wireless connection 704b.

Figure 8:
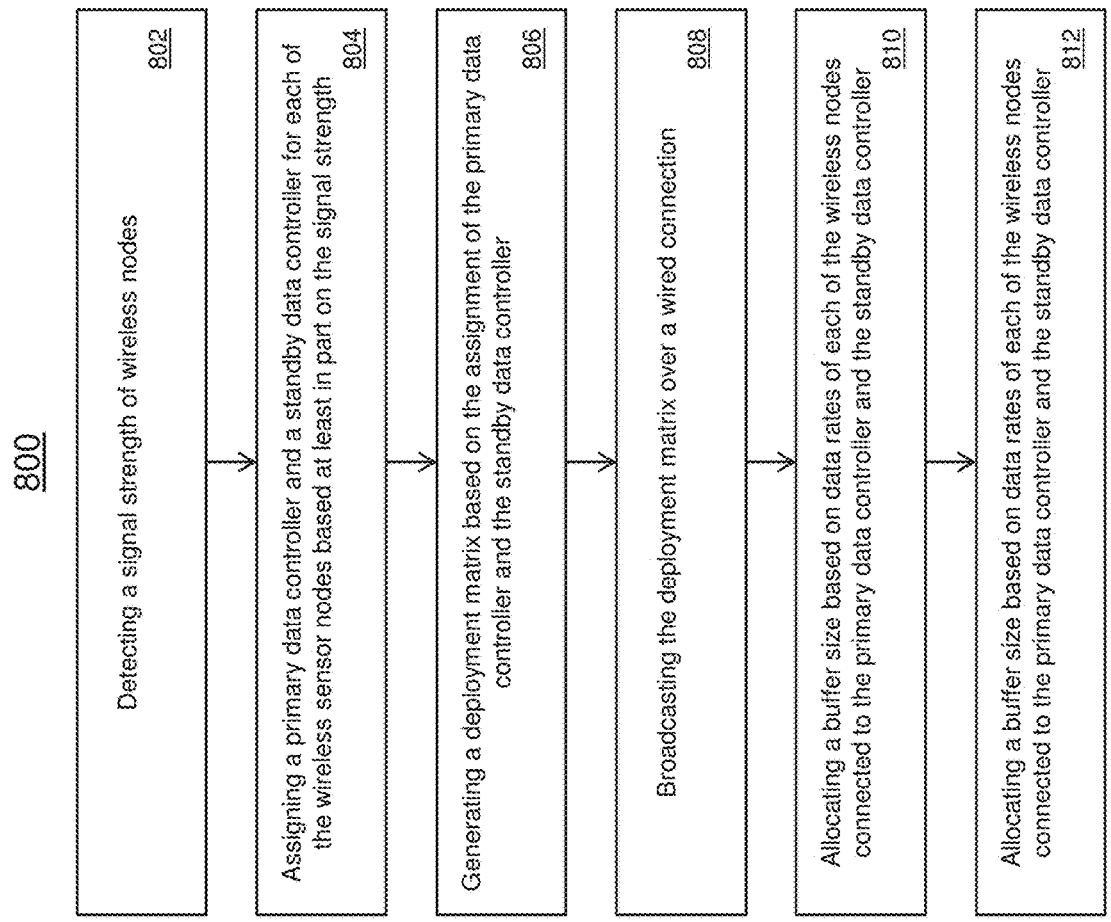
FIG. 8 depicts a high-level flowchart for communicating in an architecture for wireless avionics communication networks.

Now referring to FIG. 8, a high-level flowchart for implementing an architecture for wireless avionics communication networks. Block 802 provides detecting a signal strength of wireless nodes. In one or more embodiments of the invention the signal strength detected from the wireless nodes are used to select primary and standby wireless data controllers. The selection can be based on the highest signal strength and/or load balancing at a particular data controller. In addition, clusters of wireless nodes can be formed based on the signal strength. Block 804 provides assigning a primary data controller and standby data controller for each of the wireless nodes based at least in part on the signal strength.

Block 806 provides generating a deployment matrix based on the assignment of the primary data controller and the standby data controller. In one or more embodiments, the deployment matrix is similar to the deployment matrix 300 shown in FIG. 3. Block 808 provides broadcasting the deployment matrix over a wired connection. The deployment matrix is transmitted to each wireless data controller over a secure wired connection. The deployment matrix is used to configure the network of wireless nodes for communication.

Block 810 provides allocating a buffer size based on data rates of each of the wireless nodes connected to the primary data controller and the standby data controller. In a non-limiting example, wireless nodes having a higher data rate will be allocated more memory in the buffer compared to a wireless node having a lower data rate. Block 812 provides exchanging data based on the deployment matrix.

Technical benefits and effects include utilizing spatial and spectral redundancies to implement a robust architecture and fault tolerant network. In addition, the architecture by implementing a dynamic buffering scheme supports synchronous and asynchronous communication required to meet the timing deadlines of aircraft applications.

In addition, the techniques described herein achieve a flexible, scalable and adaptable architecture for current and future configurations for sensor networks for PHM. This allows for efficient deployment and enhancement of sensor networks onboard the aircraft. The proposed solution allows for the reduction of costs associated with network deployment, maintenance and enhancement. The configurations support a platform to implement various health monitoring applications such as IVHM, PHM, SHM, AHM, etc. The described architecture is also configurable and adaptable for various aircraft systems such landing systems, fire protection systems, air data systems, protection systems, cabin monitoring systems and so on.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for architectures for wireless avionics communication networks, comprising:
    detecting a signal strength of wireless nodes;
    assigning a primary data controller and standby data controller for each of the wireless nodes based at least in part on the signal strength;
    connecting each of the wireless nodes to the primary data controller and the standby data controller;
    generating a deployment matrix based on the assignment of the primary data controller and the standby data controller;
    broadcasting the deployment matrix over a wired connection;
    allocating a buffer size based on data rates of each of the wireless nodes connected to the primary data controller and the standby data controller; and
    exchanging data based on the deployment matrix.

2. The method of claim 1, wherein the deployment matrix identifies a primary channel and standby channel of the primary data controller and a primary channel and standby channel of the standby data controller.

3. The method of claim 1, further comprises responsive to the failure of the primary channel of the primary data controller, selecting a secondary channel of the primary data controller indicated in the deployment matrix.

4. The method of claim 3, further comprises responsive to a failure of the standby channel of the primary data controller, selecting a primary channel of a standby data controller indicated in the deployment matrix.

5. The method of claim 4, further comprises responsive to a failure of the primary channel of the standby controller, selecting a standby channel of the standby controller indicated in the deployment matrix.

6. The method of claim 5, further comprises responsive to a failure of the standby channel of the standby data controller, entering an idle mode.

7. The method of claim 1, further comprises implementing a dynamic buffering scheme, wherein each buffer is configured to receive data at different data rates from each of the wireless nodes.

8. The method of claim 1, wherein a network manager transmits data obtained from wireless nodes to an aircraft application for monitoring health of an aircraft.

9. A system for architectures for wireless avionics communication, comprising:
    a network manager;
    a primary data controller having a first and second communication interface;

a standby data controller having a first and second communication interface, wherein the primary data controller and the standby data controller are coupled to the network manager over a wired connection; and one or more wireless nodes, wherein each of the one or more wireless nodes are configured to transmit data at different rates over a wireless connection, wherein each of the one or more wireless nodes are connected to the primary data controller and connected to the standby data controller.

10. The system of claim 9, wherein the primary data controller and the standby data controller each include a dynamic buffer configured to receive data at different rates from the one or more wireless nodes.

11. The system of claim 9, wherein the network manager stores a deployment matrix identifying a primary channel and standby channel of the primary data controller and a primary channel and standby channel of the standby data controller.

12. The system of claim 11, further comprises responsive to the failure of the primary channel of the primary data controller, one or more wireless nodes communicate over a secondary channel of the primary data controller indicated in the deployment matrix.

13. The system of claim 12, further comprises responsive to a failure of the secondary channel of the primary data controller, one or more wireless nodes communicate over a primary channel of a standby data controller indicated in the deployment matrix.

14. The system of claim 13, further comprises responsive to a failure of the primary channel of the standby controller, one or more wireless nodes communicate over a standby channel of the standby controller indicated in the deployment matrix.

15. The system of claim 14, further comprises responsive to a failure of the standby channel of the standby data controller, one or more wireless nodes enter an idle mode.

* * * * *